3,591,359
CYCLIC PROCESS FOR PRODUCING TRIPOTASSIUM PHOSPHATE AND AMMONIUM CHLORIDE
Leland J. Beckman, Pasco County, Fla., assignor to Allied Chemical Corporation, New York, N.Y.
Filed Oct. 15, 1968, Ser. No. 767,759
Int. Cl. C05b 7/00; W1c 1/16; C01b 25/28
U.S. Cl. 71—34                                        9 Claims

ABSTRACT OF THE DISCLOSURE

Crystalline ammonium chloride is separated from mother liquor having base/acid ratio in range 1.25–1.5 and $NH_4^+/K^+$ mole ratio in range 80/20–72/28. The base/acid ratio of the chloride mother liquor is adjusted to 1.0 to permit crystallization and separation of mono (ammonium-potassium)phosphate, which is converted to aqueous tripotassium phosphate and solid diammonium phosphate. The latter is added to the phosphate mother liquor to adjust the base/acid ratio to 1.25–1.5, thereby producing a medium from which additional ammonium chloride can be crystallized and separated. Maintaining net balance of components by adding potassium chloride, phosphoric acid, ammonia and water permits continuous operation of the cyclic process.

BACKGROUND OF THE INVENTION

This invention relates to production of phosphate fertilizers, and in particular to a cyclic process for the production of tripotassium phosphate fertilizer solution with by-product formation of crystalline ammonium chloride.

For a period of several years there has been a trend in the fertilizer field toward the development of liquid compositions suitable for marketing and direct application to the soil with or without first diluting with water. For this purpose, the composition must contain a suitably high content of fertilizing elements for it to be economical to ship in solution form, and should contain these elements in proper ratios to meet the food requirements of growing plants. To these criteria must be added the requirement that the liquids have low enough salting out temperatures so that they may be stored, transported, and applied to the soil without interference by excessive deposition of solids from the solution.

It is known that potassium phosphates are useful as water-soluble fertilizers. However, a low cost process for the production of potassium phosphates has heretofore not been available. Potassium chloride is a common source of potassium, but for fertilizer purposes the use of tripotassium phosphate is preferred; the latter material contains a higher level of potassium than does the chloride and it is also more soluble, thereby permitting more concentrated solutions. For these reasons, there is a need for an efficient process for converting the readily available chloride salt to more efficient tripotassium phosphate. However, attempts to effect this conversion by reacting potassium chloride with ammonium phosphates have been generally unsuccessful heretofore, due to the greater solubility of ammonium chloride with respect to potassium chloride. Since an efficient procedure for the production of tripotassium phosphate solutions by this reaction requires precipitation of ammonium chloride, it is necessary that such a process reverse the natural tendency of potassium chloride to precipitate rather than ammonium chloride.

SUMMARY OF THE INVENTION

This invention involves a two-stage process for the production of triammonium phosphate by reaction of ammonium phosphates with potassium chloride. The first stage is a cyclic crystallization process wherein is produced a crystalline mixture of monoammonium phosphate and monopotassium phosphate. In the second stage, this crystalline mixture is converted into tripotassium phosphate product and diammonium phosphate, with the latter being recycled into the first stage.

It has been found that crystalline ammonium chloride and a mixture of crystalline monoammonium phosphate and monopotassium phosphate can be produced by the cyclic process involving the steps:

(a) Adding diammonium phosphate to an aqueous phosphate mother liquor, which phosphate mother liquor as a base/acid ratio of about 1.0 and a $NH_4^+/K^+$ mole ratio equal to the $NH_4^+/K^+$ mole ratio of an ammonium chloride mother liquor, said diammonium phosphate being added to said phosphate mother liquor in an amount sufficient to convert said phosphate mother liquor into a chloride crystallizing medium having a base/acid ratio between the base/acid ratio of said phosphate mother liquor and a base/acid ratio which provides maximum phosphate solubility in the chloride crystallizing medium;

(b) Separating crystalline ammonium chloride from said chloride crystallizing medium at 15–60° C. to provide said ammonium chloride mother liquor set forth in step (a) with a $NH_4^+/K^+$ mole ratio greater than a $NH_4^+/K^+$ mole ratio at which crystalline potassium chloride equilibrates with said ammonium chloride mother liquor;

(c) Adding potassium chloride, diammonium phosphate and phosphoric acid to the ammonium chloride mother liquor in respective amounts sufficient to provide a phosphate crystallizing medium having a composition such that, upon separation therefrom of a mixture of crystalline monoammonium phosphate and crystalline monopotassium phosphate to provide a phosphate mother liquor with potassium ion content equal to the potassium ion content of said ammonium chloride mother liquor, said resulting phosphate mother liquor will have a chloride ion content equal to the initial chloride ion content of said chloride crystallizing medium, a $NH_4^+/K^+$ mole ratio equal to the $NH_4^+/K^+$ mole ratio of said ammonium chloride mother liquor, and a base/acid ratio of about 1.0;

(d) Separating from said phosphate crystallizing medium a mixture of crystalline monoammonium phosphate and crystalline monopotassium phosphate in an amount sufficient to provide said phosphate mother liquor having a potassium ion content equal to the potassium ion content of said ammonium chloride mother liquor; and then (e) Repeating said steps (a)–(d) on said phosphate mother liquor.

By treating the crystalline mixture with aqueous ammonia, a three-phase system is formed including a light liquid phase rich in ammonia, a heavy liquid phase rich in tripotassium phosphate, and a solid phase of triammonium phosphate. The heavy liquid phase is the product solution useful as a fertilizer, and the solid phase may be heated to generate diammonium phosphate, which is utilized to adjust the composition of said mother liquors. In this way, aqueous tripotassium phosphate and crystalline ammonium chloride are produced by a cyclic process in which only potassium chloride, phosphoric acid, ammonia and water are consumed. By maintaining a net balance of components, continuous operation of the cyclic process is possible.

BRIEF DESCRIPTION OF THE INVENTION

For a better understanding of the instant invention, reference is made to the accompanying drawings, wherein.

DETAILED DESCRIPTION OF THE INVENTION

The instant overall process for production of aqueous tripotassium phosphate and crystalline ammonium chloride involves two stages. The first stage includes a cyclic crystallization process for producing the crystalline ammonium chloride and a crystalline mixture of monoammonium phosphate and monopotassium phosphate, by the reaction of ammonium phosphate with potassium chloride. It is this stage of the overall process which involves reversing the natural tendency for potassium chloride to precipitate rather than ammonium chloride.

In the second stage of the overall process, the crystalline mixture is converted to diammonium phosphate and aqueous tripotassium phosphate product. The diammonium phosphate is returned to the first stage as required, with any remaining portion remaining as by-product.

Figure 1:
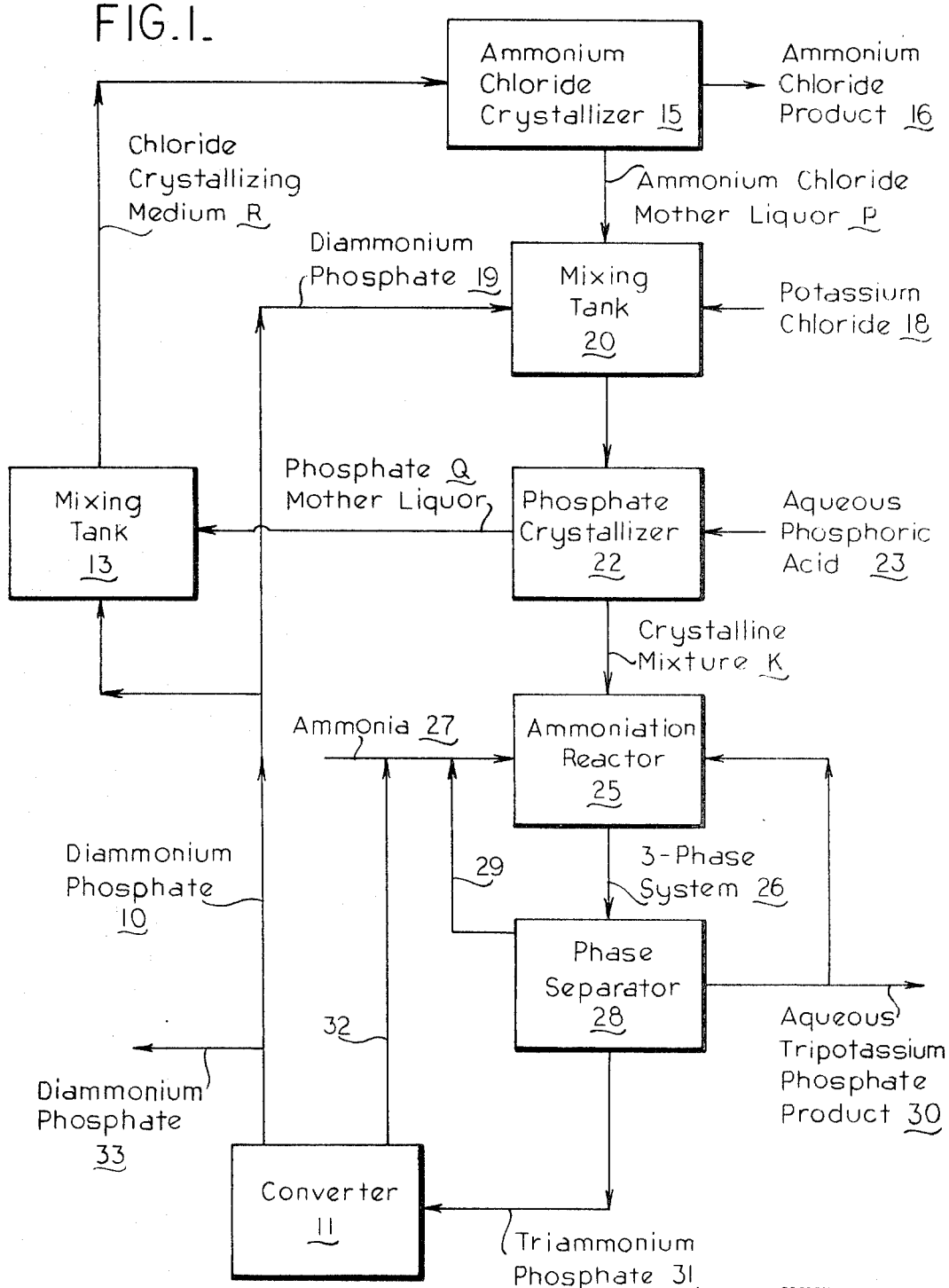
FIG. 1 is a flow diagram of the process.

Referring to FIG. 1, the instant process involves adding diammonium phosphate 10, obtained from converter 11 in the second stage, to phosphate mother liquor Q in mixing tank 13. The resulting chloride crystallizing medium R is sent to ammonium chloride crystallizer 15, wherein crystalline ammonium chloride 16 is separated as by-product from its mother liquor P. Ammonium chloride mother liquor P is then mixed with potassium chloride 18 and diammonium phosphate 19 in mixing tank 20, the latter material again being obtained from converter 11 in the second stage. The resultant mixture is sent to phosphate crystallizer 22. Phosphoric acid 23 is admixed therewith to provide phosphate crystallizing medium U. Crystalline mixture K of monopotassium and monoammonium phosphates, forms in crystallizer 22 and is separated from its mother liquor and sent to ammoniation reactor 25 in the second stage. Phosphate mother liquor Q is recycled to mixing tank 13 in the first stage.

A three-phase system 26, formed in reactor 25 by the addition of ammonia 27, is sent to phase separator 28, where the light aqueous ammonia phase 29 is separated and recycled to reactor 25 and aqueous tripotassium phosphate 30 is separated as product. The third phase, solid triammonium phosphate 31, is sent from separator 28 to converter 11, wherein diammonium phosphate 10 and ammonia-water 32 are formed. The diammonium phosphate 10 is then recycled to the first stage, with any excess removed at 33 as by-product, and ammonia-water 32 is recycled to reactor 25. A portion of said aqueous tripotassium phosphate 30, is also recycled to reactor 25 in order to facilitate handling the solid phase triammonium phosphate.

The unexpected ability to crystallize ammonium chloride in the first stage from a crystallizing medium containing potassium ions is dependent upon the effect of the base/acid ratio of the medium upon phosphate solubility. For purposes of this invention, base/acid ratio is defined by the equation.

$$\text{Base/acid ratio} = \frac{\text{Moles MAP} + 2 \text{ (moles DAP)}}{\text{Moles MAP} + \text{moles DAP}}$$

wherein MAP is monoammonium phosphate and DAP is diammonium phosphate. Inasmuch as each mole of diammonium phosphate provides one mole of monoammonium phosphate, in accordance with convention adopted in FIG. 2, $NH_4^+/K^+$ mole ratios in this invention are calculated on the basis of one mole of $NH_4^+$ per each mole of diammonium and monoammonium phosphates.

Figure 2:
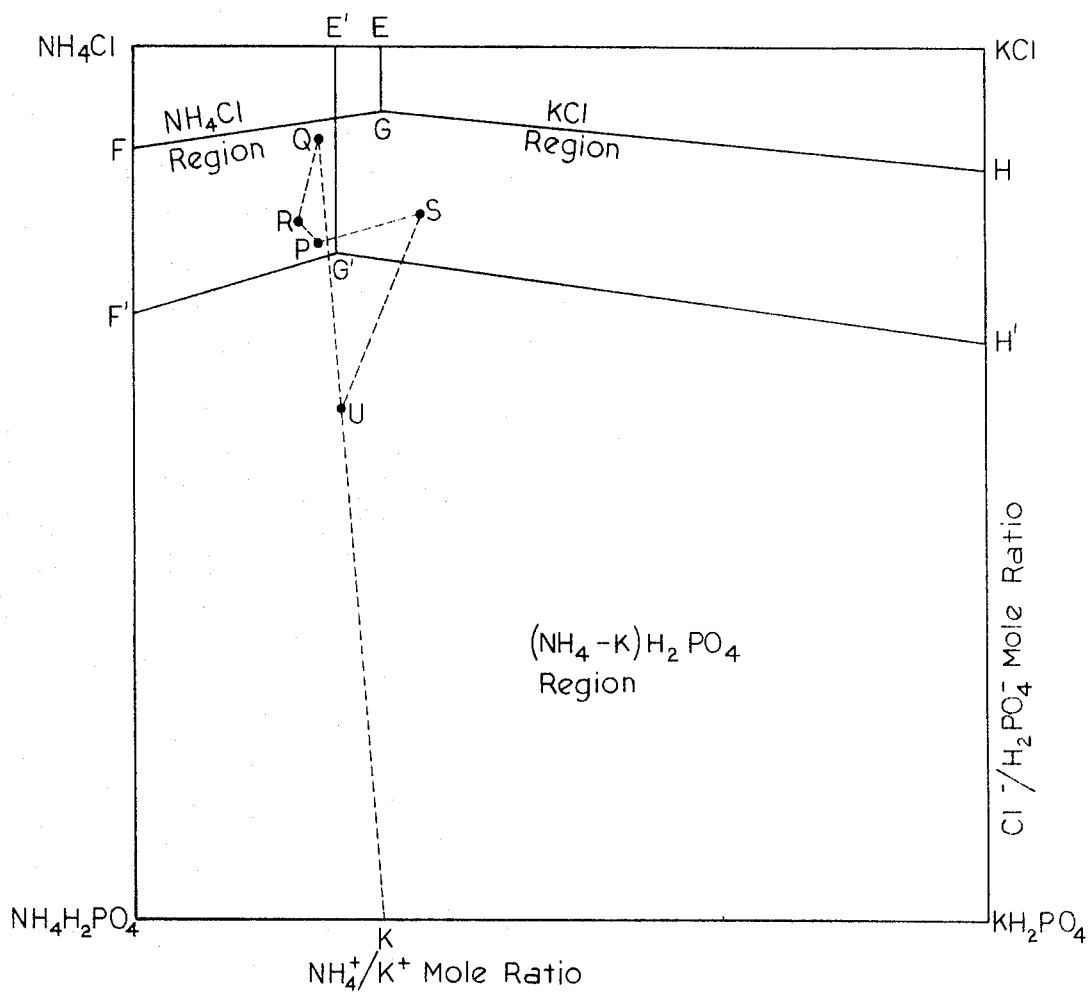
FIG. 2 is a schematic phase diagram of the system $NH_4^+$—$K^+$—$Cl^-$—$H_2PO_4^-$—$H_2O$.

The effect of base/acid ratio on solubility is illustrated in FIG. 2 which is a phase diagram for the instant system over the temperature range 0–90° C. A point on the phase diagram represents the $NH_4^+/K^+$ and $Cl^-/H_2PO_4^-$ mole ratios of the composition in question. FIG. 2 is intended to be an illustrative representation of the instant system, with the location of points and lines therein being approximate and not intended to provide a quantitative measure of relative concentrations. Solid lines FGH and EG in the diagram represent the phase boundaries when the base/acid ratio is about 1.0, which is the ratio for monophosphates. The area enclosed by line EGH represents those compositions from which potassium chloride will crystallize; the area enclosed by EGF represents those compositions from which ammonium chloride will crystallize; and the area below FGH represents those compositions from which a solid solution of mono(ammonium-potassium)phosphate will crystallize. A solution having the composition represented by point G will be in equilibrium with all three solid phases. With rising temperature, point G is displaced to higher $NH_4^+/K^+$ and lower $Cl^-/H_2PO_4^-$ ratios, i.e., downward and to the left.

As the base/acid ratio of the composition is raised above 1.0, the entire phase boundary system EFGH shifts. Thus, as the base/acid ratio is raised to about 1.4 by the addition of diammonium phosphate, the phase boundaries shift from EFGH to E'F'G'H', indicating increasing solubility of the mixed monophosphates and ammonium chloride, and decreasing solubility of potassium chloride. However, it has been found that at a base/acid ratio slightly less than 1.6, phosphate solubility reaches a maximum after which it decreases rapidly. Furthermore, the entire relationship is altered at this critical base/acid ratio of slightly less than 1.6, since beyond this ratio the phosphate in equilibrium is no longer mono(ammonium-potassium)phosphate but is diammonium phosphate. Therefore, the instant process does not operate above this critical base/acid ratio.

FIG. 2 shows the various steps in the crystallization cycle of the instant process. Point P represents the ammonium chloride mother liquor, the composition of which is critical to successful operation of the process. In order to separate solid ammonium chloride from this liquor, it has been found necessary that the base/acid ratio of the liquor be situated between the base/acid ratio of the phosphate mother liquor, discussed in detail hereinafter, and aforesaid critical base/acid ratio corresponding to maximum phosphate solubility. Preferably, the base/acid ratio of the ammonium chloride mother liquor will be within the range of about 1.25–1.5, and more preferably about 1.4. Inasmuch as the liquid is in equilibrium with solid ammonium chloride, it is, of course, necessary that P lie within the ammonium chloride field, which is defined by F'G'E' for the particular base/acid ratio employed. This necessitates that the $NH_4^+/K^+$ mole ratio of the ammonium chloride mother liquor exceed the value by E'G' phase boundary, i.e., greater than a $NH_4^+/K^+$ ratio at which crystalline potassium chloride might equilibrate with the liquor at the particular base/acid ratio employed. For reasons disclosed hereinafter, it is preferable that the $NH_4^+/K^+$ ratio of the ammonium chloride mother liquor be as low as possible, i.e., that it lie as close as possible to the phase boundary E'G' between the ammonium chloride and potassium chloride fields. Depending upon the particular base/acid ratio selected for the ammonium chloride mother liquor, the temperature at which the solid ammonium chloride is separated, and other parameters, the $NH_4^+/K^+$ mole ratio of the ammonium chloride mother liquor will be within the range of about 80/20–72/28, and more preferably within the range of about 78/22–75/25. In actual practice, a slight margin will be provided; for example, if the phase boundary E'G' occurs at $NH_4^+/K^+ = 75/25$, the ratio of the liquor will be about 75.5/24.5.

The $Cl^-/H_2PO_4^-$ mole ratio of the ammonium chloride mother liquor must fall within a range determined by the overall process. It must be above phase boundary F'G' in order to provide chloride crystals in equilibrium with the liquor rather than phosphate crystals, and it must be less than the $Cl^-/H_2PO_4^-$ ratio of the phosphate mother liquor since the phosphate is added to the latter in order to obtain the chloride mother liquor. Thus, normally the $Cl^-/H_2PO_4^-$ ratio of the ammonium chloride mother liquor will fall within the range of about 91/9–80/20. Preferably, it will be relatively close to phase boundary F'G' but this is not essential to successful operation of the process.

The ammonium chloride mother liquor P is obtained by crystallizing ammonium chloride from chloride crystallizing medium R, described in detail hereinafter, and then separating the solid ammonium chloride therefrom. The amount of ammonium chloride which is crystallized and separated is that amount which is sufficient to provide a mother liquor of the desired composition, i.e., sufficient to provide the desired $NH_4^+/K^+$ ratio. A crystallization temperature is selected which will result in the desired amount of ammonium chloride crystallization at the particular water level being employed. Preferably, the temperature for crystallizing and separating the ammonium chloride will be within the range of about 15–60° C. more preferably about 30–45° C.

After separation of the solid ammonium chloride, the composition of the remaining mother liquor P is adjusted to provide a phosphate crystallizing medium of composition U. This adjustment is accomplished, in part, by adding potassium chloride to chloride mother liquor P in an amount sufficient to replenish the amount of chloride ion lost by separation of ammonium chloride, i.e., phosphate crystallizing medium U will have a chloride ion content equal to the initial chloride ion content of chloride crystallizing medium R. Upon adding potassium chloride to chloride mother liquor P, a mixture of composition S is obtained; inasmuch as the phosphate content of the system is not altered by separating crystalline ammonium chloride and adding potassium chloride, the $Cl^-/H_2PO_4^-$ ratios of R and S are equal.

In order to provide an effective phosphate crystallizing medium, it is necessary to adjust the base/acid ratio to about 1.0. Phosphate solubility is minimized at base/acid ratio equal to 1.0 and it has been found that upon deviating from this value, the phosphate solubility increases rapidly. Therefore, it is a preferred embodiment of this invention that the base/acid ratio of the phosphate crystallizing medium be equal to 1.0. To the extent that a less efficient process can be tolerated, the base/acid ratio of the phosphate crystallizing solution might vary slightly from 1.0, say within the range of about 0.9–1.1, but more preferably within the range of about 0.95–1.05.

Also, in order to provide for a cyclic process, it is necessary that the phosphate mother liquor Q have a $NH_4^+/K^+$ mole ratio substantially equal to the $NH_4^+/K^+$ mole ratio of chloride mother liquor P. It is for this reason that the $NH_4^+/K^+$ ratio of chloride mother liquor P is selected as low as possible yet still within the ammonium chloride crystallizing field. Since selection of the chloride mother liquor ratio determines the ratio for the phosphate mother liquor, and since the objective of the crystallization cycle is efficient crystallization of monopotassium phosphate, it is desirable to select a ratio which will minimize the amount of monoammonium phosphate which is co-precipitated with the monopotassium phosphate. This is achieved by minimizing the $NH_4^+/+$ mole ratio of the phosphate crystallizing medium and mother liquor. It is noteworthy that, for location of P normally employed, the straight line QUK will be nearly vertical, i.e., phosphate crystallizing medium U and crystalline mixture K will have very nearly the same $NH_4^+/K^+$ ratio as mother liquors P and Q.

For this same reason, it is unexpectedly preferred not to employ the highest possible base/acid ratio for the ammonium chloride mother liquor, even though the highest possible ratio would permit the maximum amount of crystallization per cycle. As indicated hereinabove, increasing the base/acid ratio serves to increase the $NH_4^+/K^+$ ratio of the phase boundary E'G', and the higher $NH_4^+/K^+$ ratio of E'G', the greater will be the amount of ammonium carried over in the crystallized mono(ammonium-potassium)phosphate.

The desired base/acid ratio and $NH_4^+/K^+$ mole ratio for phosphate crystallizing medium U are obtained by adding phosphoric acid and diammonium phosphate to chloride mother liquor P along with aforementioned potassium chloride. Any order of addition of these three reagents might be employed, but it is preferable to add the potassium chloride and diammonium phosphate first, and to add the phosphoric acid only after the mixture is situated in phosphate crystallizer 22. Therefore, sufficient potassium chloride and diammonium phosphate are added to chloride mother liquor P so that upon subsequent addition of phosphoric acid and separation therefrom of crystalline mixture K, the $NH_4^+/K^+$ ratio of the resulting phosphate mother liquor will essentially equal the $NH_4^+/K^+$ ratio of chloride mother liquor P. The amount of phosphoric acid added for this purpose is sufficient to provide the desired base/acid ratio of about 1.0.

A mixture K of crystalline monoammonium phosphate and monopotassium phosphate is then crystallized and separated from phosphate crystallizing medium U in an amount sufficient to remove therefrom an amount of potassium ion equivalent to the amount of potassium chloride added to chloride mother liquor P, thereby affording phosphate mother liquor Q. By limiting the amount of crystalline mixture to be removed in this manner, an overall potassium balance is obtained and the cycle can be conducted on a continuous basis.

In order to avoid an accumulation of water in the cycle, it is necessary to maintain a water balance. Therefore, it is usually convenient to adjust the water content of phosphate crystallizing medium U so that the water content of phosphate mother liquor Q will equal the water content of chloride mother liquor P. Normally, this adjustment requires removal of a volume of water equal to that volume which was added to the system upon addition of phosphoric acid 23 to phosphate crystallizing medium U, absent other adjustments of water content during the cycle.

Upon adjusting the water content of phosphate crystallizing medium U, a suitable temperature can be employed for crystallizing and separating the crystalline mixture which will result in the desired amount of crystallization at that water content. Usually, this temperature will be within the range of about 50–65° C.

The composition of phosphate mother liquor Q is then adjusted to provide chloride crystallizing medium R by the addition of diammonium phosphate thereto in an amount sufficient to provide a base/acid ratio equal to the desired base/acid ratio of chloride mother liquor P, that is to say, a base/acid ratio between that of phosphate mother liquor Q and that corresponding to maximum phosphate solubility in chloride crystallizing medium R. Ammonium chloride is then crystallized and separated therefrom in the manner described hereinbefore, and the entire crystallization cycle is repeated in a continuous manner.

The crystalline mixture of mono(ammonium-potassium)phosphate K is treated with sufficient aqueous ammonia in ammoniation reactor 25 to cause formation of a three phase system 26, including a light liquid phase rich in ammonia, a heavy liquid phase rich in tripotassium phosphate, and a solid phase of triammonium phosphate. Preferably, the ammoniation reaction is conducted at a temperature within the range of from about $-10°$ C. to about $+70°$ C. Three phase system 26 is sent to phase separator 28 where the three phases are separated, with aqueous tripotassium phosphate 30 being collected as the product of the overall process. However, a certain portion of the tripotassium phosphate is preferably recycled back to reactor 25 due to the large quantities of triammonium phosphate being handled.

Ammonia-rich phase 29 is recycled back to reactor 25 where it serves as a source of the aqueous ammonia consumed therein, and solid triammonium phosphate 31 is sent to converter 11 where it is heated to drive off one mole ammonia and three moles of water of hydration.

The ammonia-water 32 which are thus driven off are recycled to reactor 25 as a source of aqueous ammonia, and the resulting diammonium phosphate 10 is available for consumption in the crystallization cycle. Approximately 55% of the diammonium phosphate produced in converter 11 will be consumed in mixing tanks 13 and 20 to adjust the respective compositions of phosphate and chloride mother liquors, and the remainder 33 can be collected as product useful for other purposes.

The following examples are provided to more fully illustrate the instant invention. They are provided for illustrative purposes only and are not to be construed as limiting the scope of the invention, which is defined by the appended claims.

Example I

A chloride crystallizing medium having the following analysis:

| | Grams |
|---|---|
| Monoammonium phosphate | 2430 |
| Diammonium phosphate | 1937 |
| Dipotassium phosphate | 14 |
| Potassium chloride | 2685 |
| Ammonium chloride | 4807 |
| Water | 15243 | and having base/acid ratio=1.41, was sent to an ammonium chloride crystallizer operated at 32° C. The resulting slurry was centrifuged at 32° C. to separate 753 grams of crystalline ammonium chloride. The resulting chloride mother liquor had the following analysis:

| | Grams |
|---|---|
| Monoammonium phosphate | 2428 |
| Diammonium phosphate | 1939 |
| Dipotassium phosphate | 14 |
| Potassium chloride | 2684 |
| Ammonium chloride | 4054 |
| Water | 15243 | to provide base/acid ratio=1.41 and $NH_4^+/K^+$ mole ratio=75.5/24.5. The chloride mother liquor was sent to a mixing tank where 1076 grams of potassium chloride and 2017 grams of diammonium phosphate (obtained from hereinafter described converter) were added thereto. Upon mixing, the resulting medium was sent to a phosphate crystallizer where 3943 grams of 75% aqueous phosphoric acid was added. The resulting phosphate crystallizing medium had the following analysis:

| | Grams |
|---|---|
| Monopotassium phosphate | 2002 |
| Monoammonium phosphate | 7669 |
| Potassium chloride | 2691 |
| Ammonium chloride | 4821 |
| Water | 15243 | providing a base/acid ratio=1.00 and $NH_4^+/K^+$ mole ratio=75.5/24.5. The phosphate crystallizer was operated at 55° C. and 986 grams of water, equal to the water added with the phosphoric acid, was evaporated by aeration. The resulting slurry was centrifuged at 55° C. to separate the crystalline mixture of mono(ammonium-potassium) phosphate, which had the following analysis:

| | Grams |
|---|---|
| Monopotassium phosphate | 2002 |
| Monoammonium phosphate | 5234 |
| Potassium chloride | 6 |
| Ammonium chloride | 14 |
| Water | 72 | providing a $NH_4^+/K^+$ mole ratio=75.5/24.5.

The phosphate mother liquor remaining after removal of the crystalline mixture had the following analysis:

| | Grams |
|---|---|
| Monoammonium phosphate | 2435 |
| Potassium chloride | 2685 |
| Ammonium chloride | 4807 |
| Water | 15243 | providing a base/acid ratio=1.00 and a $NH_4^+/K^+$ mole ratio=75.5/24.5. The composition of the phosphate mother liquor was then adjusted by adding 1935 grams of diammonium phosphate (obtained from hereinafter described converter) to provide chloride crystallizing medium of aforesaid analysis, which is returned to the above crystallization cycle.

The crystalline mixture of mono(ammonium-potassium) phosphate obtained hereinabove by centrifugation was sent to an ammoniation reactor which was operated at 25–40° C. Added to the mixture in the reaction were 773 grams of anhydrous ammonia, 352 grams of water, and the following compositions of indicated analysis (obtained by the process described hereinafter):

Upper layer recycle:

| | Grams |
|---|---|
| Tripotassium phosphate | 214 |
| Ammonia | 1046 |
| Water | 3046 |

Converter recycle:

| | Grams |
|---|---|
| Ammonia | 921 |
| Water | 3454 |

Tripotassium phosphate recycle:

| | Grams |
|---|---|
| Tripotassium phosphate | 5471 |
| Triammonium phosphate | 1241 |
| Ammonia | 677 |
| Potassium chloride | 32 |
| Ammonium chloride | 80 |
| Water | 5844 |

Boiler recycle:

| | Grams |
|---|---|
| Ammonia | 149 |
| Water | 100 |

A three phase system was thereby formed by ammoniation of the crystalline mixture, which was sent to a phase separator operated at 25–40° C. The light liquid phase rich in ammonia was separated from the heavy liquid phase and solid phase (which existed as a slurry), and was recycled to the ammoniation reaction. This recycle is referred to above as "Upper Layer Recycle."

The slurry of the heavy liquid phase and solid phase was centrifuged and the two phases were separated. A portion of the liquid phase, referred to above as "Tripotassium Phosphate Recycle," was recycled to the ammoniation reactor. The remainder of the lower liquid phase, having the following analysis:

| | Grams |
|---|---|
| Tripotassium phosphate | 1000 |
| Triammonium phosphate | 227 |
| Ammonia | 123 |
| Potassium chloride | 6 |
| Ammonium chloride | 14 |
| Water | 1069 | was sent to a boiler, where the above-mentioned "Boiler Recycle" was removed and sent to the ammoniation reactor, to leave aqueous tripotassium phosphate product of the following analysis:

| | Grams |
|---|---|
| Tripotassium phosphate | 1000 |
| Diammonium phosphate | 204 |
| Potassium chloride | 6 |
| Ammonium chloride | 14 |
| Water | 969 |

The solid triammonium phosphate phase which was obtained by centrifugation of the slurry had the following analysis:

| | Grams |
|---|---|
| Triammonium phosphate trihydrate | 10929 |
| Tripotassium phosphate | 43 |
| Ammonia | 6 |
| Water | 545 |

This solid phase was then heated in a converter to drive off 921 grams of ammonia and 3454 grams of water, which ammonia and water were recycled to the ammoniation reactor and referred to above as "Converter Recycle." The remaining solid material had the following analysis:

| | Grams |
|---|---|
| Diammonium phosphate | 7101 |
| Triammonium phosphate | 43 |

Portions of this material were recycled for addition to the chloride and phosphate mother liquors as indicated hereinabove, and the remainder was collected as product.

Example II

The procedure of the crystallization cycle of Example I was repeated with modifications indicated below.

The chloride crystallizing medium had the following analysis:

| | Grams |
|---|---|
| Monoammonium phosphate | 1438 |
| Diammonium phosphate | 1650 |
| Potassium chloride | 1640 |
| Ammonium chloride | 3504 |
| Water | 9010 | to provide a base/acid ratio=1.5. The solid ammonium chloride was crystallized and separated at 43° C. to provide a chloride mother liquor of the following analysis:

| | Grams |
|---|---|
| Monoammonium phosphate | 1438 |
| Diammonium phosphate | 1650 |
| Potassium chloride | 1640 |
| Ammonium chloride | 2836 |
| Water | 910 | and having a base/acid ratio=1.5 and $NH_4^+/K^+$ mole ratio=78.0/22.0. To this chloride mother liquor were added 932 grams of potassium chloride, 2099 grams of diammonium phosphate, 2783 grams of phosphoric acid and 936 grams of water to provide the phosphate crystallizing medium. The 936 grams of water were evaporated and the crystallization and separation of solid mono-(ammonium-potassium) phosphate was conducted at 60° C. The mixed phosphate solid contained 5094 grams of monoammonium phosphate and 1701 grams of monopotassium phosphate ($NH_4^+/K^+$ mole ratio=78.0/22.0). The phosphate mother liquor had the following analysis:

| | Grams |
|---|---|
| Monoammonium phosphate | 1438 |
| Potassium chloride | 1640 |
| Ammonium chloride | 3504 |
| Water | 9010 | to provide base/acid ratio=1.0 and $NH_4^+/K^+$ mole ratio=78.0/22.0. The composition of the phosphate mother liquor was adjusted by addition of 1650 grams of diammonium phosphate to afford the initial chloride crystallizing medium which was returned to the crystallization cycle.

What is claimed is:

1. A cyclic process for preparing crystalline ammonium chloride and a crystalline mixture of monoammonium phosphate and monopotassium phosphate comprising the steps of:
 (a) adding diammonium phosphate to an aqueous phosphate mother liquor, which phosphate mother liquor has a base/acid ratio of about 1.0, said base/acid ratio being defined by the equation $$\text{Base/acid ratio} = \frac{\text{Moles MAP} + 2 \text{ (moles DAP)}}{\text{Moles MAP} + \text{moles DAP}}$$

wherein MAP is monoammonium phosphate and DAP is diammonium phosphate, and a $NH_4^+/K^+$ mole ratio equal to the $NH_4^+/K^+$ mole ratio of an ammonium chloride mother liquor having a $NH_4^+/K^+$ mole ratio within the range of about 80/20–72/28, said $NH_4^+/K^+$ mole ratio being calculated on the basis of one mole of $NH_4^+$ per mole of diammonium and monoammonium phosphates, and said diammonium phosphate being added to said phosphate mother liquor in an amount sufficient to convert said phosphate mother liquor into a chloride crystallizing medium having a base/acid ratio within the range of about 1.25–1.5;
 (b) separating crystalline ammonium chloride from said chloride crystallizing medium at 15–60° C. to provide said ammonium chloride mother liquor set forth in step (a) with a $NH_4^+/K^+$ mole ratio greater than a $NH_4^+/K^+$ mole ratio at which crystalline potassium chloride equilibrates with said ammonium chloride mother liquor;
 (c) adding potassium chloride, diammonium phosphate and phosphoric acid to the ammonium chloride mother liquor in respective amounts sufficient to provide a phosphate crystallizing medium having a composition such that, upon separation therefrom of a mixture of crystalline monoammonium phosphate and crystalline monopotassium phosphate to provide a phosphate mother liquor with potassium ion content equal to the potassium ion content of said ammonium chloride mother liquor, said resulting phosphate mother liquor will have a chloride ion content equal to the initial chloride ion content of said chloride crystallizing medium, a $NH_4^+/K^+$ mole ratio equal to the $NH_4^+/K^+$ mole ratio of said ammonium chloride mother liquor, and a base/acid ratio of about 1.0;
 (d) separating from said phosphate crystallizing medium a mixture of crystalline monoammonium phosphate and crystalline monopotassium phosphate in an amount sufficient to provide said phosphate mother liquor havving a potassium ion content equal to the potassium ion content of said ammonium chloride mother liquor; and then
 (e) repeating said steps (a)–(d) on said phosphate mother liquor.

2. The process of claim 1 wherein the temperature at which said crystalline ammonium chloride is separated from the chloride crystallizing medium in step (b) is within the range of about 30–45° C.

3. The process of claim 1 wherein the temperature at which said mixture of crystalline monoammonium phosphate and crystalline monopotassium phosphate is separated from the phosphate crystallizing medium in step (d) is within the range of about 50–65° C.

4. A cyclic process for preparing crystalline ammonium chloride and aqueous tripotassium phosphate comprising the steps:
 (a) adding diammonium phosphate to an aqueous phosphate mother liquor, which phosphate mother liquor has a base/acid ratio of about 1.0, said base/acid ratio being defined by the equation $$\text{Base/acid ratio} = \frac{\text{Moles MAP} + 2 \text{ (moles DAP)}}{\text{Moles MAP} + \text{moles DAP}}$$

wherein MAP is monoammonium phosphate and DAP is diammonium phosphate, and a $NH_4^+/K^+$ mole ratio equal to the $NH_4^+/K^+$ mole ratio of an ammonium chloride mother liquor having a $$NH_4^+/K^+$$

mole ratio within the range of about 80/20–72/28, said $NH_4^+/K^+$ mole ratio being calculated on the basis of one mole of $NH_4^+$ per mole of diammonium and monoammonium phosphates, and said diammonium phosphate being added to said phosphate mother liquor in an amount sufficient to convert said phosphate mother liquor into a chloride crystallizing medium having a base/acid ratio within the range of about 1.25–1.5;
 (b) separating crystalline ammonium chloride from said chloride crystallizing medium at 15–60° C. to provide said ammonium chloride mother liquor set forth in step (a) with a $NH_4^+/K^+$ mole ratio greater than a $NH_4^+/K^+$ mole ratio at which crystalline potassium chloride equilibrates with said ammonium chloride mother liquor;

(c) adding potassium chloride, diammonium phosphate and phosphoric acid to the ammonium chloride mother liquor in respective amounts sufficient to provide a phosphate crystallizing medium having a composition such that, upon separation therefrom of a mixture of crystalline monoammonium phosphate and crystalline monopotassium phosphate to provide a phosphate mother liquor with potassium ion content equal to the potassium ion content of said ammonium chloride mother liquor, said resulting phosphate mother liquor will have a chloride ion content equal to the initial chloride ion content of said chloride crystallizing medium, a $NH_4^+/K^+$ mole ratio equal to the $NH_4^+/K^+$ mole ratio of said ammonium chloride mother liquor, and a base/acid ratio of about 1.0;

(d) separating from said phosphate crystallizing medium a mixture of crystalline monoammonium phosphate and crystalline monopotassium phosphate in an amount sufficient to provide said phosphate mother liquor having a potassium ion content equal to the potassium ion content of said ammonium chloride mother liquor;

(e) treating said crystalline mixture with sufficient aqueous ammonia to cause formation of a light liquid phase rich in ammonia, a heavy liquid phase rich in tripotassium phosphate and a solid phase of triammonium phosphate;

(f) separating the heavy liquid phase rich in tripotassium phosphate;

(g) heating the solid phase of triammonium phosphate to generate diammonium phosphate, ammonia and water;

(h) adding the diammonium phosphate generated in step (g) to the phosphate mother liquor of step (d) in an amount sufficient to provide the chloride crystallizing medium of step (a); and (i) repeating said step (b)–(h) on the resulting chloride crystallizing medium.

5. The process of claim 4 wherein the temperature at which said ammonium chloride is separated from the chloride crystallizing medium in step (b) is within the range of about 30–45° C.

6. The process of claim 4 wherein the temperature at which said mixture of crystalline monoammonium phosphate and crystalline monopotassium phosphate is separated from the phosphate crystallizing medium in step (d) within the range of about 50–65° C.

7. The process of claim 4 wherein the temperature at which said crystalline mixture is treated with aqueous ammonia in step (e) is within the range from about −10° C. to about +70° C.

8. The process of claim 4 additionally comprising recycling said light liquid phase rich in ammonia as a source of aqueous ammona in step (e).

9. The process of claim 4 wherein said process is operated continuously.

References Cited
UNITED STATES PATENTS 2,189,488  2/1940  Desseure _____ 23—302X REUBEN FRIEDMAN, Primary Examiner R. BARNES, Assistant Examiner U.S. Cl. X.R.

23—100, 107, 302; 71—36